United States Patent [19]
Kuroda et al.

[11] Patent Number: 5,757,643
[45] Date of Patent: May 26, 1998

[54] REMOTE MANAGEMENT SYSTEM

[75] Inventors: Kiyomitsu Kuroda, Otsu; Ichiro Fukuoka, Kusatsu; Akira Takenaka, Kameoka, all of Japan

[73] Assignee: Sanyo Electric Co., Ltd., Osaka, Japan

[21] Appl. No.: 644,973

[22] Filed: May 15, 1996

[30] Foreign Application Priority Data

May 15, 1995 [JP] Japan .................. 7-116133

[51] Int. Cl.⁶ .................................. G05B 19/414
[52] U.S. Cl. .................. 364/138; 200/83 WM; 379/74; 379/102.01; 370/419
[58] Field of Search ................. 364/138, 423.099; 137/387; 200/83 WM; 246/250.203; 379/74, 102.01; 370/419

[56] References Cited

U.S. PATENT DOCUMENTS

| | | | |
|---|---|---|---|
| 5,386,362 | 1/1995 | Keret | 364/406 |
| 5,390,385 | 2/1995 | Beldham | 8/158 |
| 5,424,940 | 6/1995 | Ousborne | 364/140 |
| 5,570,085 | 10/1996 | Bertsch | 340/825.07 |
| 5,579,496 | 11/1996 | Van Steenbrugge | 395/567 |
| 5,586,174 | 12/1996 | Bogner et al. | 379/106 |

FOREIGN PATENT DOCUMENTS

| | | |
|---|---|---|
| 6-205900 | 7/1994 | Japan . |
| 8-317073 | 11/1996 | Japan . |

*Primary Examiner*—James P. Trammell
*Assistant Examiner*—Patrick J. Assovad
*Attorney, Agent, or Firm*—Darby & Darby

[57] ABSTRACT

A remote management system where data detected by a sensor for detecting a condition of a machine is input from an input port of an interface unit of a control unit such as a microcomputer, and the interface unit is connected via a data transmission controller over a communication line with a central control apparatus which manages a machine like a washing machine from remote, and further the detected data is transmitted from the interface unit to the central control apparatus though the control unit is inapplicable to communication, while the interface unit passes the detected data of the sensor without processing and outputs the detected data to the control unit by means of setting the state of an output port thereof same as that of the input port.

7 Claims, 3 Drawing Sheets

REMOTE MANAGEMENT SYSTEM

BACKGROUND OF THE INVENTION

1. Field of the Invention

The present invention relates to a remote management system, wherein control units such as microcomputers control operations of machines which are connected to a central control apparatus, namely an arithmetic apparatus such as a personal computer, via means of communication, and the machines are managed by the central control apparatus from remote.

2. Description of the Related Art

In a launderette, for example, wherein a plurality of washing machines and dryers are installed and used with charge, namely with coins or prepaid cards, a control system for controlling such laundry machines with respect to trouble and charge in a unified way at a remote location is requested in order to enhance control efficiency by reducing the number of the staffs or by stopping making the rounds of the launderettes.

This kind of control system has been proposed in Japanese Laid-open Patent Application NO. Hei 6-205900 by the applicant of the present invention. A plurality of laundry machines, such as washing machines and dryers, are installed in each launderette. Sensors, such as a rotation sensor, a thermistor and a coin sensor, are disposed in various portions such as a motor, a drum and a charge box of each laundry machine, and the output signals of these sensors are input to a microcomputer. In accordance with the signals from the sensors, the microcomputer controls the operation of the laundry machine, stores data regarding operation conditions, remaining operation time, sales figures, etc. and transmits the stored data to a data controller (hereinafter referred to as DTC) disposed in each launderette. Each DTC is connected via the public telephone line to a central control apparatus comprising a personal computer provided for the proprietor of a laundry business or a management company entrusted with the management of the laundry machines by the proprietor.

The central control apparatus transmits a monitor request via the public telephone line to each DTC in order to monitor machine operation conditions, remaining operation time, sales figures, operation charge setting and operation time setting, etc. In order to cause the microcomputers to transmit various kinds of data regarding the monitor request, the DTC transmits commands requesting the transmission of data to the microcomputers of the machines in sequence. The DTC transmits data request commands in sequence to the microcomputers of the machines installed in the launderette. Upon receiving the data from the microcomputers, the DTC transmits the data to the central control apparatus.

In case of trouble such as a machine failure, abnormality or charge theft, the microcomputer of the corresponding laundry machine stops the machine and supplies a transmission request command to the DTC. Upon receiving a response from the DTC, the microcomputer transmits trouble data related to the occurred trouble. The DTC calls up the central control apparatus in order to transmit the received trouble data. Upon receiving a response from the central control apparatus, the DTC transmits the above-mentioned trouble data. In accordance with the received trouble data, the central control apparatus displays the data on a monitor display and gives alarms to alert the proprietor of the laundry business or the operator of the management company to the occurrence of the trouble.

On the other hand, microcomputers inapplicable to communication are installed in old-type machines at launderettes to control the operation of the machines. In this case, interfaces applicable to communication are provided for such machines, and the interfaces are connected to the DTC in order to transmit requested specific information to the central control apparatus.

Among the sensors installed in the above-mentioned machine, the coin sensor for sensing, for example, the passing of coins having been inserted into the charge box delivers a signal to the above-mentioned interface as well as to the microcomputer for controlling the operation of the machine. The interface is equipped with a charge control counter to count the number of input times of the signal. When a command is transmitted from the DTC, the interface transmits the number of charge counts to the DTC, and the DTC transmits the number of counts to the central control apparatus.

However, when such an old-type machine equipped with the microcomputer inapplicable to communication is used in the above-mentioned conventional remote management system, the interface connected to the machine transmits only the information on the sensors connected to the interface. To perform sufficient remote control, however, as many sensors as possible must be connected to the interface, and the detection data from the sensors must be transmitted to the central control apparatus. However, when an attempt is made to transmit data as many as the detection data, having been input from a plurality of sensors provided in the old-type machine to the microcomputer for controlling the operation of the machine, to the interface, wiring must be performed from the sensors to both the microcomputer and the interface. This causes difficult wiring problems. For example, wide wiring space is required, and wiring is necessary to be forked in two branches: the wiring to the microcomputer and the wiring to the interface.

To solve the problems, a configuration is conceived, wherein data from each sensor is supplied to the microcomputer via the interface, and the data is transmitted from the interface to the DTC. However, the detection timing of the microcomputer for controlling the operation of the machine differs depending on the type and generation of the microcomputer. Therefore, the interface must supply the data from the sensor to the microcomputer in a sequence suitable for the microcomputer. To attain the above-mentioned data transmission, different types of interfaces must be prepared depending on the type and generation of the microcomputer. This is impractical, however.

SUMMARY OF THE INVENTION

This invention has been devised in such circumstances and, an object of the present invention is to provide a remote management system which can transmit detection data from sensors for detecting the conditions of a machine to a central control apparatus via an interface applicable to communication even when the control unit of the machine is inapplicable to communication, and can obtain detection data from the sensors via the interface.

The remote management system of the invention is provided with an interface applicable to communication, wherein detection data from sensors for detecting machine conditions is input from a plurality of input ports corresponding to the sensors so that the conditions of the plural input ports are detected, the conditions of the output port are set at the conditions of the corresponding input ports, the detection data from the sensors is output at all times to the control unit for controlling machine operation without processing the sensor detection data, and the sensor detection data is transmitted to the central control apparatus via a data controller.

Therefore, the control unit can read the sensor detection data at proper timings conforming to the sequence of the control unit itself. Furthermore, even in a system having a different sequence for each type of machine such as a system for managing many types of laundry machines from remote, such as dryers and washing machines, the interface can supply sensor detection data to the control unit regardless of the sequence of the machine control unit.

In addition, the remote management system of the invention is provided with an interface applicable to communication which stores the conditions of the plural input ports receiving the detection data from the sensors for detecting machine conditions, and depending on a transmission request command from the data controller for controlling data transmission to and reception from the central control apparatus for managing machines from remote, transmits the detection data selected from among the stored detection result data and relating to the transmission request command to the central control apparatus via the data controller.

Consequently, the data controller can obtain the sensor detection data from the interface. Moreover, the sensor detection data can be transmitted to the central control apparatus from the interface via the data controller, even in case of a laundry machine such as a dryer and a washing machine equipped with a control unit inapplicable to communication.

The above and further objects and features of the invention will more fully be apparent from the following detailed description with accompanying drawings.

DESCRIPTION OF THE PREFERRED EMBODIMENTS

Figure 1:
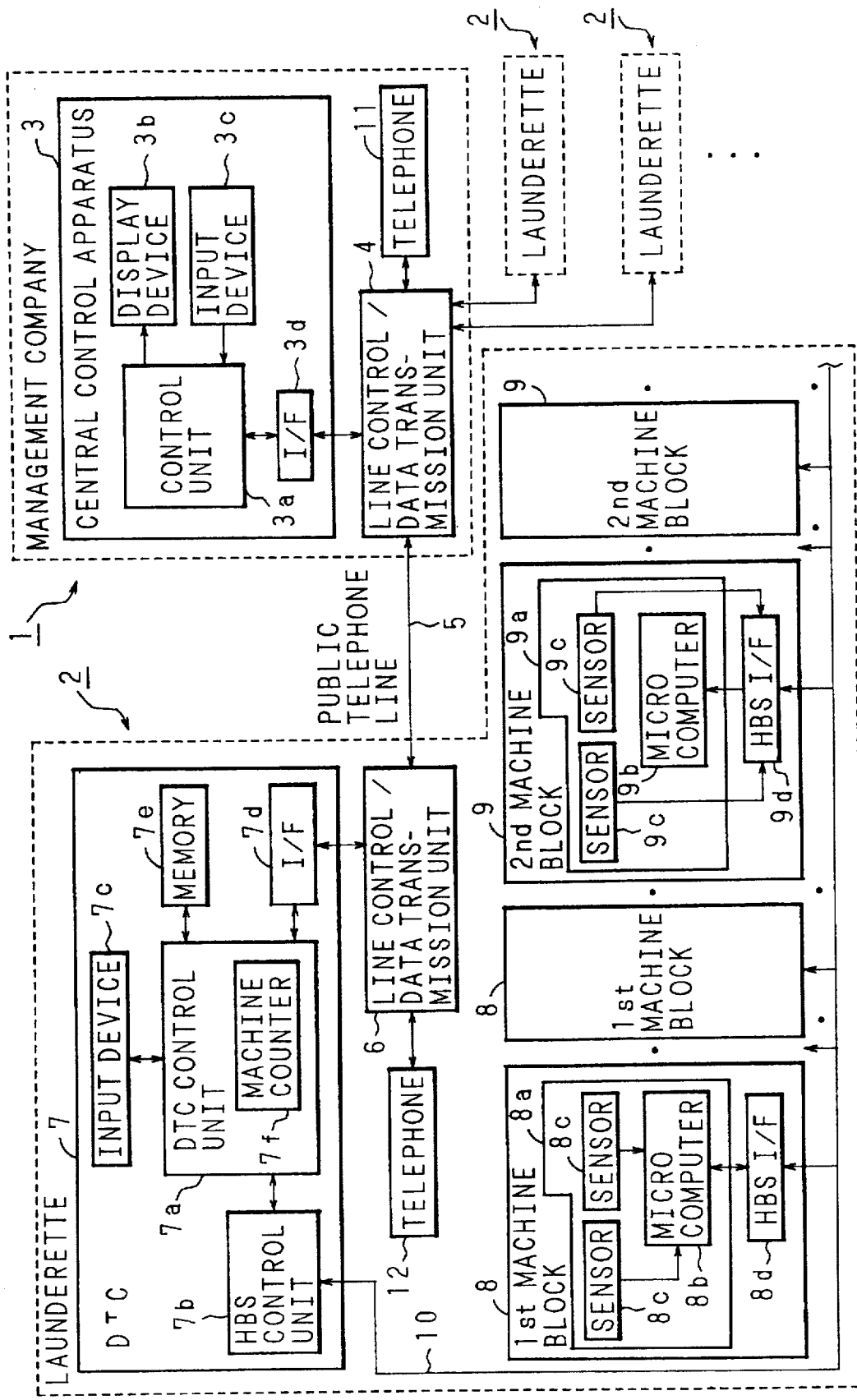
FIG. 1 is a block diagram showing the configuration of a remote management system in accordance with the present invention.

FIG. 1 is a block diagram showing the configuration of a remote management system in accordance with the invention. Referring to FIG. 1, numeral 2 designates a launderette, and numeral 1 designates a management company for managing a plurality of launderettes 2, 2, . . . The launderette 2 is provided with first machine blocks 8, 8, . . . and second machine blocks 9, 9, . . . . . The first machine block 8 comprises a machine 8a such as a dryer and a washing machine equipped with a microcomputer 8b applicable to serial data communication, and an interface 8d (hereinafter referred to as I/F) based on a home bus system (hereinafter referred to as HBS). The second machine block 9 comprises a machine 9a such as a dryer and a washing machine equipped with a microcomputer 9b inapplicable to serial data communication, and an interface 9d for HBS.

Each microcomputer 8b provided for the machine 8a in the first machine block 8 starts drying or washing operation in accordance with a charge input command such as coin entry and a start command, controls machine operation in accordance with signals from sensors 8c, 8c, . . . such as a rotation speed sensor and a temperature sensor. In addition, each microcomputer 8b transmits data regarding charge input, start command, rotation speed, temperature, etc. and trouble data regarding abnormal charge input, abnormal rotation speed, abnormal temperature, etc. via each HBS I/F 8d.

On the other hand, the signals detected by sensors 9c, 9c, . . . such as a rotation speed sensor and a temperature sensor, provided for each machine 9a in the second machine block 9 are supplied to the microcomputer 9b via the HBS I/F 9d applicable to serial data communication. The microcomputer 9b controls drying or washing operation in accordance with the detection signals. At predetermined intervals, the HBS I/F 9b detects whether the levels of the input ports receiving the signals from the sensors 9c, 9c, . . . are H or L, and delivers the detection results from the output ports to the microcomputer 9b. Consequently, the HBS I/F 9d can supply information from the sensors 9c, 9c, . . . to the microcomputer 9b regardless of the sequence in the microcomputer 9b. Furthermore, the HBS I/F 9d transmits the conditions of the input ports to the DTC 7 via one twisted pair 10.

Each HBS I/F 8d, 8d, . . . also transmits data to the DTC 7 via the twisted pair 10. The twisted pair 10 is connected to an HBS control unit 7b provided for the DTC 7. The HBS control unit 7b controls the transmission of commands requesting transmission of data from the first machine blocks 8, 8, . . . and the second machine blocks 9, 9, . . . to the DTC 7, and also controls the transmission of responses corresponding to the commands from the first machine blocks 8, 8, . . . and the second machine blocks 9, 9, . . . .

The HBS control unit 7b transmits and receives data transmission request commands and reception data for the first machine blocks 8, 8, . . . and the second machine blocks 9, 9, . . . to and from a DTC control unit 7a for controlling the operation of the DTC 7. The DTC control unit 7a is connected to an input device 7c for setting information on the name, telephone number, etc. of the launderette provided with the DTC 7, a memory 7e for storing data received from the first machine blocks 8, 8, . . . and the second machine blocks 9, 9, . . . , and an interface 7d such as an RS-232C interface. In addition, the DTC control unit 7a is equipped with a machine counter 7f for preventing repetitive transmission.

The I/F 7d of the DTC 7 is connected to an I/F 3d provided in a central control apparatus 3 comprising a personal computer via a line control/data transmission unit 6 such as a modem, the public telephone line 5 and a line control/data transmission unit 4 on the side of the management company 1. Communication between the line control/data transmission unit 6 and the line control/data transmission unit 4 is performed in accordance with the error correction and data compression methods specified in the MNP 5. A telephone 12 is connected to the line control/data transmission unit 6 on the side of the launderette 2, and a telephone 11 is connected to the line control/data transmission unit 4 on the side of the management company 1 so as to be used for telephone communication.

The central control apparatus 3 is provided with a display device 3b such as a CRT display; an input device 3c such as a keyboard; and a control unit 3a such as a CPU. When a data transmission request command such as a sales figure request command or an operation condition request command, is input from the input device 3c, the control unit 3a transmits the request command to the DTC 7 of the launderette 2 via the I/F 3d and the line control/data transmission unit 4, and reads data received by the line control/ data transmission unit 4 via the I/F 3d, and then displays the data on the display device 3b.

In this type of remote management system, when a monitor request is supplied from the central control apparatus 3 of the management company 1 to the DTC 7 of the launderette 2 via the public telephone line 5, the DTC 7 calls the microcomputers 8b, 8b, ... of the first machine blocks 8, 8, ... and the HBS I/Fs 9d, 9d, ... of the second machine blocks 9, 9, ... in sequence as described below, the microcomputers 8b, 8b, ... and the HBS I/Fs 9d, 9d, ... are caused to return data. Consequently, necessary data can also be transmitted to the central control apparatus 3 via the HBS I/Fs 9d, 9d, ... from the second machine blocks 9, 9, ... which are equipped with the microcomputers 9b, 9b, ... inapplicable to communication, whereby high-quality control can be attained even in the second machine blocks 9, 9, ....

Figure 2:
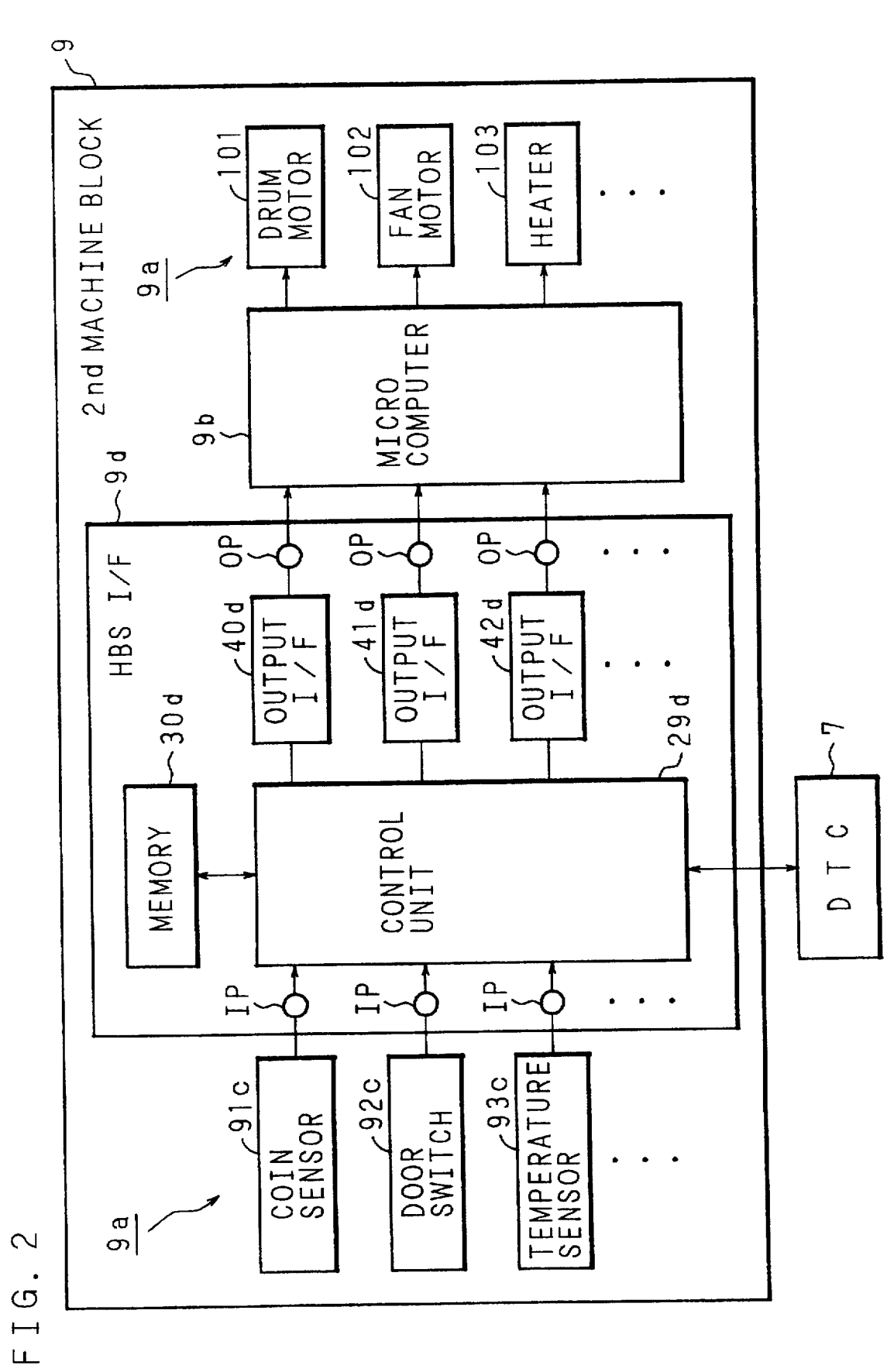
FIG. 2 is a block diagram showing the configuration of an HBS I/F and the configuration of a second machine block equipped with the HBS I/F in accordance with the invention.

FIG. 2 is a block diagram showing the configuration of the HBS I/F 9d and the configuration of the second machine block 9 equipped with the HBS I/F 9d in accordance with the invention. The machine 9a of the second machine block 9 has a plurality of sensors such as a coin sensor 91c for detecting coins inserted into a charge box, a door switch 92c for detecting door opening/closing condition and a temperature sensor 93c provided for a motor or in a drying chamber to detect temperature. The detection signals from the sensors are supplied from the corresponding plural input ports IP, IP.... provided for the HBS I/F 9d to a control unit 29d. The HBS I/F 9d is provided with plural output ports OP, OP, ... corresponding to the input ports IP, IP, ... The outputs of the control unit 29d are supplied from the output ports OP, OP, ... corresponding to the input ports IP, IP, ... to the microcomputer 9b via output I/Fs 40d, 41d, 42d, ... used as drivers.

At predetermined intervals, the control unit 29d performs detection and determines in sequence whether the levels of the input ports IP, IP, ... are H (=high) or L (=low). When the level of an input port IP is H as a result of detection, the control unit 29d sets the level of the corresponding output port OP at H so as to deliver the level to the microcomputer 9b of the machine 9a, and supplies the detection results of the input ports IP, IP, ... to a memory device 30d so as to store the results. Monitor request commands are supplied from the DTC 7 to the control unit 29d. When a monitor request command is supplied to the control unit 29d, the control unit 29d reads the data corresponding to the request from the memory device 30d in accordance with the command supplied from the DTC 7, and transmits the data to the DTC 7.

On the other hand, the microcomputer 9b reads data supplied from the output ports OP, OP, ... of the HBS I/F 9d, and supplies control commands to a drum motor 101 for rotating a drum, a fan motor 102 and a heater 103 for sending warm air to a drying chamber, etc. in accordance with the data so as to control the operations of such machines.

Figure 3:
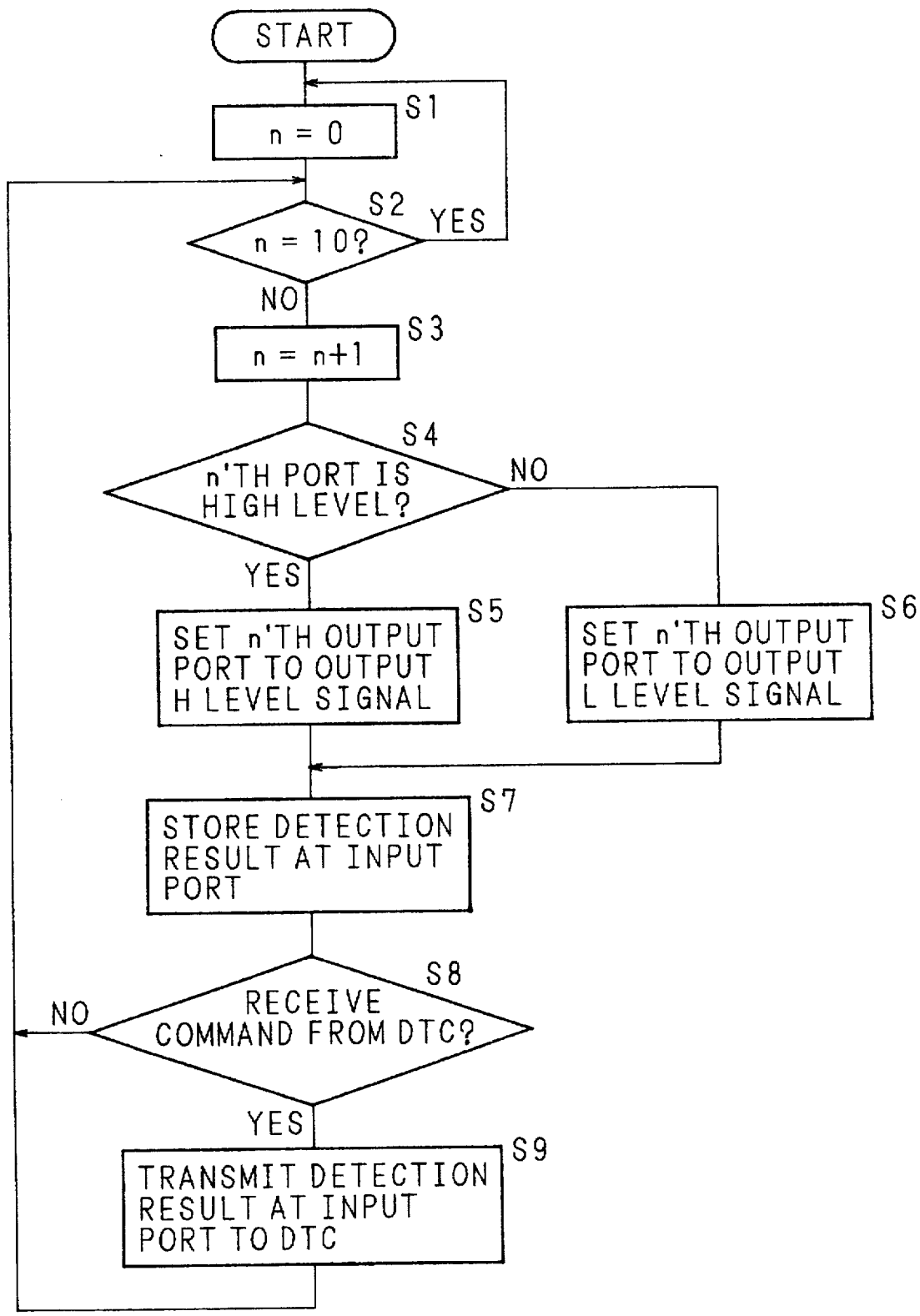
FIG. 3 is a flowchart showing a control procedure for the HBS I/F of the remote management system in accordance with the invention.

FIG. 3 is a flowchart showing a control procedure for the HBS I/F 9d of the remote management system in accordance with the invention. The HBS I/F 9d clears counter value n (step S1), and then determines whether the counter value n is the total number, 10, for example, of the input ports IP, IP, ... or not (step S2). When the HBS I/F 9d determines that n is not 10, the HBS I/F 9d increments the counter value n by one (step S3). The HBS I/F 9d then determines whether the level of the input port IP corresponding to the counter value is H or not (step S4).

When the HBS I/F 9d determines that the level of the input port IP is H, the HBS I/F 9d delivers an H level signal to the microcomputer 9b from the output port OP corresponding to the counter value n (step S5). Furthermore, when the HBS I/F 9d determines that the level of the input port IP is not H but L, the HBS I/F 9d delivers an L level signal to the microcomputer 9b from the output port OP corresponding to the counter value n (step S6). The HBS I/F 9d then stores the detection result of the input port IP at the corresponding address in the memory device 30d (step S7).

Furthermore, the HBS I/F 9d determines whether a monitor request command has been received from the DTC 7 or not (step S8). When the HBS I/F 9d determines that a monitor request command has been received, the HBS I/F 9d reads the detection result corresponding to the command from the memory unit 30d and transmits the result to the DTC 7 (step S9). After returning to step S2, the HBS I/F 9d performs detection of the conditions of the input ports IP, IP, ..., storage of the detection results and delivery of the detection results from the output ports OP, OP, ..., until n reaches 10. When the HBS I/F 9d determines that n=10, the HBS I/F 9d returns to step S1, clears the counter number n, and repeats the above-mentioned operation.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A system including a central control apparatus for remotely managing a machine based on machine status data detected by a sensor at said machine comprising:

a machine controller for controlling operation of said machine based on the sensor detected status data; and an interface unit between said sensor and said machine controller to provide communication from said sensor to both of said machine controller and said remote central control apparatus, said interface unit having an input port to which said sensor is directly connected to receive the machine status data detected;

an output port for outputting a signal to said machine controller to control machine operation;

detecting means for detecting the state of the data received from said sensor at said input port;

setting means for setting the state of the data at said output port to be the same as that of said input port to effect control of the machine by said machine controller in accordance with the sensor detected data; and transmitting means responsive to a request command from the remote central control apparatus for transmitting the state of the data set by said setting means.

2. A system as set forth in claim 1, wherein said machine is a laundry machine.

3. A system as set forth in claim 1, further comprising a data transmission controller for transmitting a command to said interface unit to request transmission of the data detected by said sensor, and for controlling data transmission to/from said remote central control apparatus, and said interface unit further comprising:

storing means for storing the sensor data state result detected by said detecting means;

judging means for judging reception of said transmission request command from said data transmission controller; and transmitting means for reading the sensor data state detection result from said storing means to transmit the sensor data state detection result to the data transmission controller if said judging means judges that said transmission request command is received.

4. A remote management system as set forth in claim 3, wherein said machine is a laundry machine.

5. A remote management system where a machine controller incapable of communication controls an operation of a machine based on data detected by a sensor which detects a condition of the machine, and a data transmission controller controls transmission of data to/from a central control apparatus which remotely manages said machine based on said detected data, and an interface unit transmits said detected data in response to a command requesting transmission of said detected data transmitted from the data transmission controller, said interface unit comprising:

an input port to which said sensor is directly connected for inputting the data detected by said sensor;

detecting means for detecting the state of the inputted data at said input port;

storing means for storing the state of the inputted data result detected by said detecting means;

judging means for judging whether said transmission request command has been received; and transmitting means for reading the state of the inputted data detection result from said storing means in response to said transmission request command to transmit the detection result when said judging means judges that said transmission request command is received.

6. A remote management system as set forth in claim 5, wherein said machine is a laundry machine.

7. An interface unit provided between a sensor for detecting a status of a machine and a machine controller which is incapable of communication to a remote location for controlling operation of said machine which is remotely managed by a central control apparatus based on the sensor detected status data, comprising:

an input port which is to be connected to an output terminal of a sensor;

an output port for outputting a signal to the machine controller to control machine operation;

detecting means for detecting the state of the data received from said sensor at said input port;

setting means for setting the state of the data at said output port to be the same as that of said input port to effect control of the machine by said machine controller in accordance with the sensor detected data;

storing means for storing the sensor data state result detected by said detecting means;

judging means for judging reception of a transmission request command to request transmission of the data detected by said sensor from the central control apparatus; and transmitting means for reading the sensor data state result from said storing means to transmit the data state detection result to the central control apparatus if said judging means judges that said transmission request command is received.

* * * * *